United States Patent
Li et al.

(10) Patent No.: US 8,281,597 B2
(45) Date of Patent: Oct. 9, 2012

(54) COOLED FLAMEHOLDER SWIRL CUP

(75) Inventors: Shui-Chi Li, West Chester, OH (US); Mark Anthony Mueller, West Chester, OH (US); Michael Louis Vermeersch, Hamilton, OH (US); Timothy James Held, Akron, OH (US)

(73) Assignee: General Electric Company, Schenectady, NY (US)

( * ) Notice: Subject to any disclaimer, the term of this patent is extended or adjusted under 35 U.S.C. 154(b) by 954 days.

(21) Appl. No.: 12/347,165

(22) Filed: Dec. 31, 2008

(65) Prior Publication Data

US 2010/0162713 A1   Jul. 1, 2010

(51) Int. Cl.
   *F02C 1/00* (2006.01)
(52) U.S. Cl. .......................................... 60/748
(58) Field of Classification Search .............. 60/737, 60/740, 742, 746, 748, 752–760
See application file for complete search history.

(56) References Cited

U.S. PATENT DOCUMENTS

| | | | |
|---|---|---|---|
| 3,899,884 A | 8/1975 | Ekstedt | |
| 3,905,192 A | 9/1975 | Pierce et al. | |
| 3,946,552 A | 3/1976 | Weinstein et al. | |
| 5,099,644 A | 3/1992 | Sabla et al. | |
| 5,142,858 A | 9/1992 | Ciokajlo et al. | |
| 5,197,289 A | 3/1993 | Glevicky et al. | |
| 5,237,820 A | 8/1993 | Kastl et al. | |
| 5,289,685 A | 3/1994 | Hoffa | |
| 5,943,866 A | 8/1999 | Lovett et al. | |
| 6,058,710 A | 5/2000 | Brehm | |
| 6,164,055 A | 12/2000 | Lovett et al. | |
| 6,279,323 B1 | 8/2001 | Monty et al. | |
| 6,453,660 B1 * | 9/2002 | Johnson et al. | 60/39.821 |
| 6,550,251 B1 | 4/2003 | Stickles et al. | |
| 6,606,861 B2 | 8/2003 | Snyder | |
| 6,834,505 B2 | 12/2004 | Al-Roub et al. | |
| 6,862,889 B2 | 3/2005 | Held et al. | |
| 6,871,501 B2 | 3/2005 | Bibler et al. | |
| 6,952,927 B2 | 10/2005 | Howell et al. | |
| 7,007,479 B2 | 3/2006 | Held et al. | |
| 7,059,135 B2 | 6/2006 | Held et al. | |
| 8,001,761 B2 * | 8/2011 | Myers et al. | 60/39.281 |
| 2006/0096296 A1 | 5/2006 | Held et al. | |
| 2006/0123792 A1 | 6/2006 | Xu et al. | |
| 2006/0248898 A1 | 11/2006 | Buelow et al. | |
| 2007/0039329 A1 | 2/2007 | Abreu et al. | |
| 2008/0229753 A1 | 9/2008 | Li et al. | |
| 2008/0236165 A1 * | 10/2008 | Baudoin et al. | 60/746 |

* cited by examiner

*Primary Examiner* — Phutthiwat Wongwian
(74) *Attorney, Agent, or Firm* — General Electric Company; David J. Clement; William S. Andes

(57) ABSTRACT

A combustor swirl cup includes coaxial inner and outer swirlers separated by a tubular centerbody. The centerbody includes a bypass inlet surrounding the inner swirler and diverges aft along a perforate inner nozzle to terminate at an annular flameholder. An impingement ring is spaced forward from the flameholder in flow communication with the bypass inlet for receiving cooling air therefrom to impingement cool the flameholder.

18 Claims, 4 Drawing Sheets

COOLED FLAMEHOLDER SWIRL CUP

BACKGROUND OF THE INVENTION

The present invention relates generally to gas turbine engines, and, more specifically, to combustors therein.

In a gas turbine engine, air is pressurized in a compressor and mixed with fuel in a combustor for generating hot combustion gases. Energy is extracted from the gases in turbine stages which power the compressor and a shaft that typically drives a fan in an aircraft turbofan engine application.

A high pressure turbine (HPT) directly follows the combustor and receives the hottest gases therefrom from which energy is initially extracted. A low pressure turbine (LPT) follows the HPT and extracts additional energy from the gases.

In the combustor, fuel and air are mixed and ignited for generating the hot combustion gases. Combustion efficiency is a primary factor in the overall efficiency of the gas turbine engine.

Furthermore, exhaust emissions are also important design factors since government regulations typically limit the amount of undesirable exhaust products, including unburned hydrocarbons UHC, carbon monoxide CO, and nitrogen oxides NOx.

Modern combustor design further addresses combustor durability and life under the extremely hostile operating environment of generating and containing the hot combustion gases. The various combustor complements are subject to considerable heat loads, and must be suitably cooled during operation for suitable life.

Combustors may be operated rich but that increases fuel consumption and undesirable carbon emissions. Combustors may be operated lean to reduce nitrogen oxide emissions, but combustion stability is decreased.

In a dry low emissions (DLE) combustor, the fuel is burned lean which subjects the combustor to possible instability in which large acoustic pressures can drive structural vibrations and increase heat flux into the combustor liners.

Flame flashback in its longitudinal mode is another problem, along with flame blow off in tangential or radial modes.

Combustion instability may be resolved by introducing a flameholder in the combustor to anchor the lean, premixed combustion flame. However, the anchored flame can overheat the flameholder itself and thereby decrease durability and life of the combustor.

These competing design considerations for the combustor require corresponding compromises in design, and further increase the complexity of combustor design.

Accordingly, it is desired to provide a combustor configured for dry low emissions performance with enhanced flame stability.

BRIEF DESCRIPTION OF THE INVENTION

A combustor swirl cup includes coaxial inner and outer swirlers separated by a tubular centerbody. The centerbody includes a bypass inlet surrounding the inner swirler and diverges aft long a perforate inner nozzle to terminate at an annular flameholder. An internal impingement ring is spaced forward from the flameholder in flow communication with the bypass inlet for receiving cooling air therefrom to impingement cool the flameholder.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
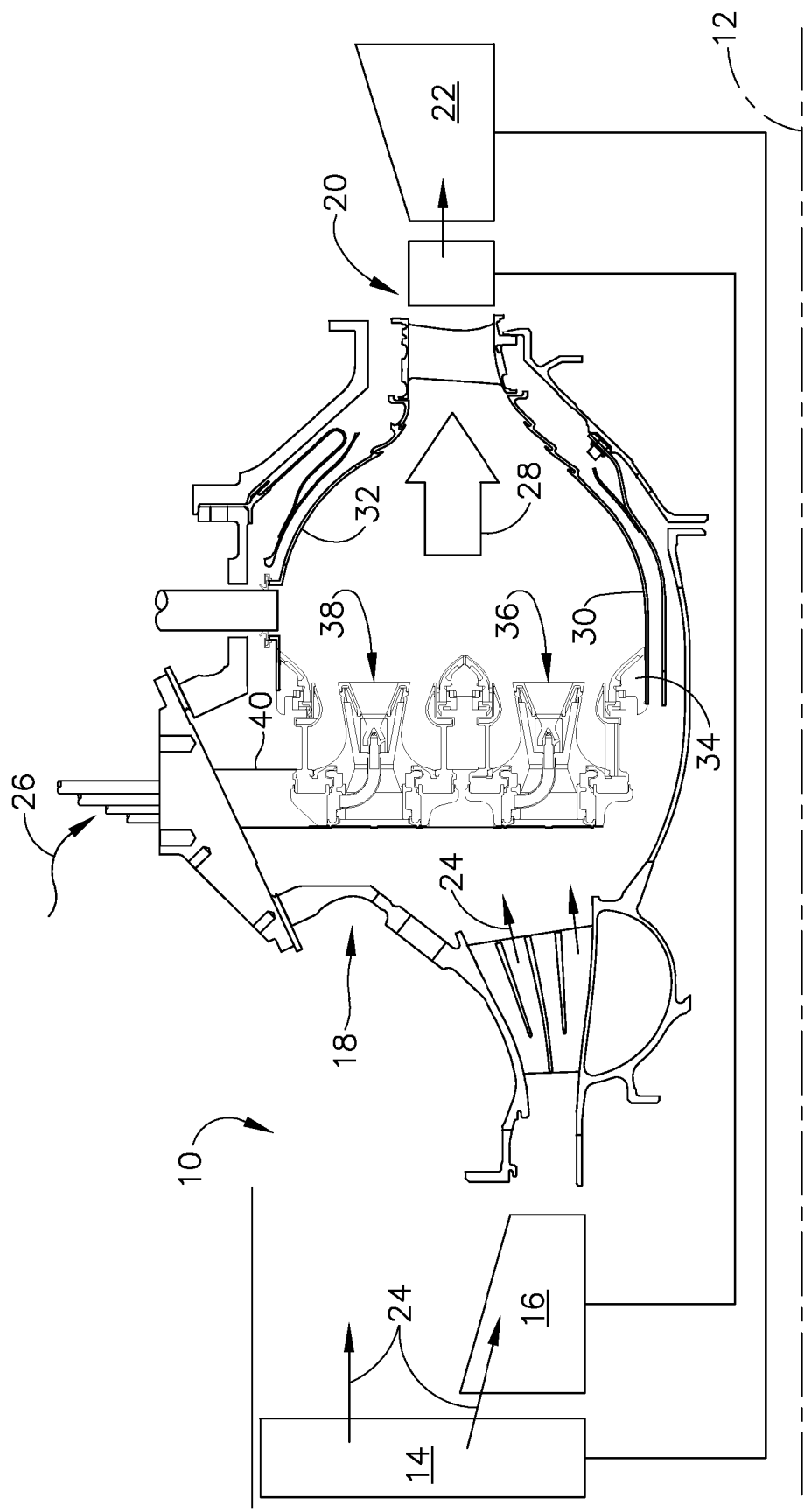
FIG. 1 is a schematic axial view of a turbofan aircraft engine having a double annular combustor.

Illustrated schematically in FIG. 1 is a turbofan gas turbine engine 10 which is axisymmetrical about a longitudinal or axial centerline axis 12.

The engine includes in serial flow communication a fan 14, compressor 16, combustor 18, high pressure turbine (HPT) 20, and low pressure turbine (LPT) 22. The rotor of the HPT 20 is joined to the rotors of the compressor 16 by one drive shaft, and the rotors of the LPT 22 are joined to the fan 14 by another drive shaft.

During operation, air 24 flows past the fan 14 and an inner portion thereof is further pressurized by the compressor blades of the axial compressor 16. The pressurized air 24 under compressor discharge pressure (CDP) is channeled to the combustor 18 and mixed with fuel 26 therein for generating hot combustion gases 28.

Energy is extracted from the combustion gases in the turbine blades of the HPT 20 to drive the compressor blades. Additional energy is extracted from the gases in the turbine blades of the LPT 22 to drive the fan blades.

Figure 2:
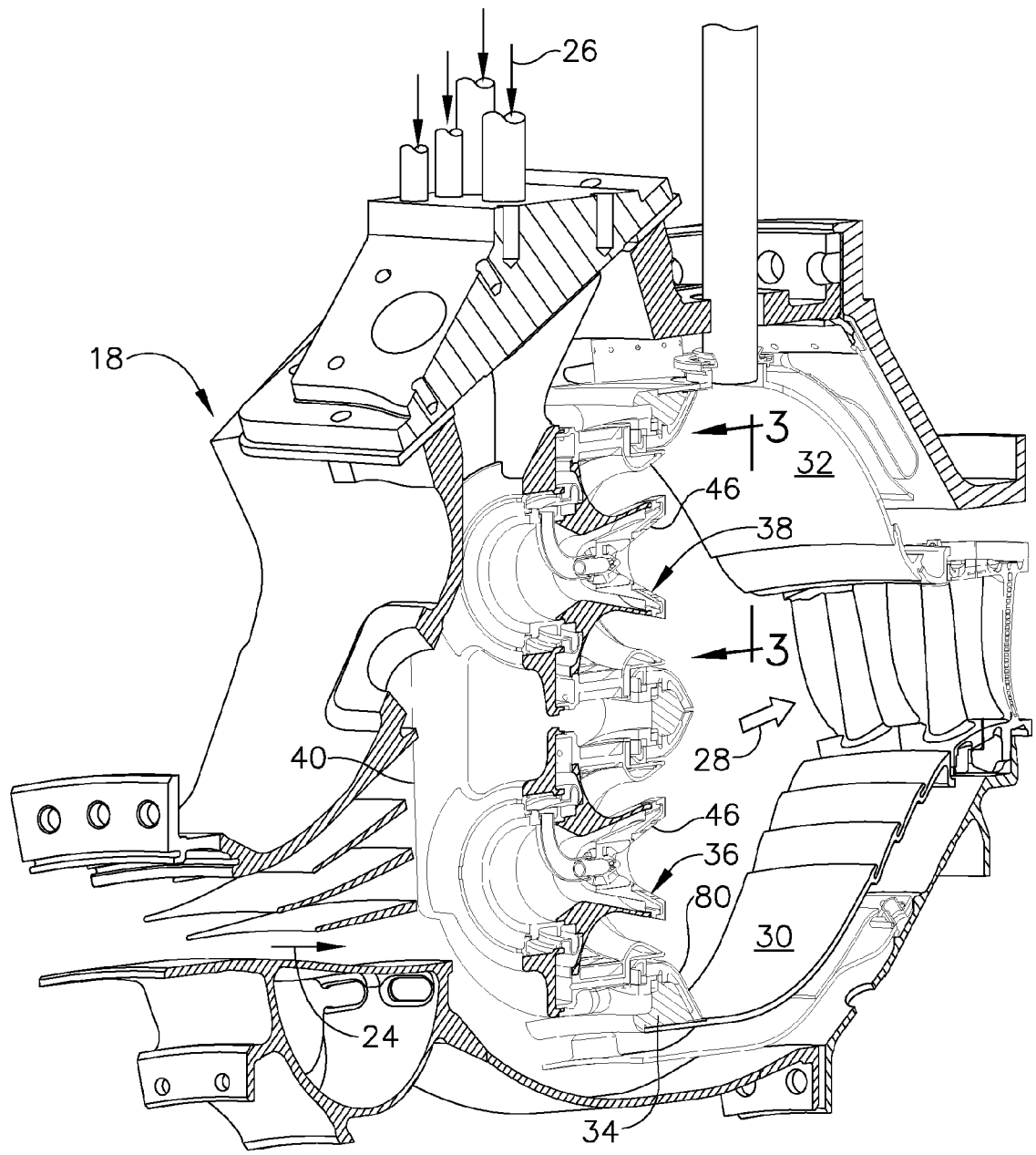
FIG. 2 is an isometric, axial sectional view of the combustor illustrated in FIG. 1 having radially inner and outer swirl cups.

The combustor 18 illustrated in FIGS. 1 and 2 is a dual annular combustor (DAC) and includes a radially inner combustion liner 30 and a radially outer combustion liner 32 joined to an annular dome 34 at forward ends. The liners terminate at aft ends defining an annular outlet that is joined to the first stage turbine nozzle.

Mounted through corresponding apertures in the dome 34 is a row of radially inner swirl cups 36 and a radially outer row of outer swirl cups 38. The swirl cups are configured for mixing fuel and pressurized air which is then suitably ignited for generating the hot combustion gases 28 during operation.

The inner and outer swirl cups 36,38 are specifically configured as described hereinbelow to premix main fuel and air in a lean mixture prior to discharge into the combustor around a pilot fuel/air mixture, and are therefore also referred to as premixers. The premixers 36,38 are mounted in pairs from a common radial supporting stem 40 that includes suitable conduits therein for separately channeling the fuel 26. Many stems 40 are spaced circumferentially apart around the centerline axis 12, with each stem having two premixer swirl cups 36,38 for collectively feeding the combustion process.

Each of the swirl cups 36,38 has a similar configuration but suitably varies in size for its use in the combustor. Disclosed hereinbelow are details of each of the outer swirl cups 38, with each of the inner swirl cups 36 having identical counterparts.

Figure 3:
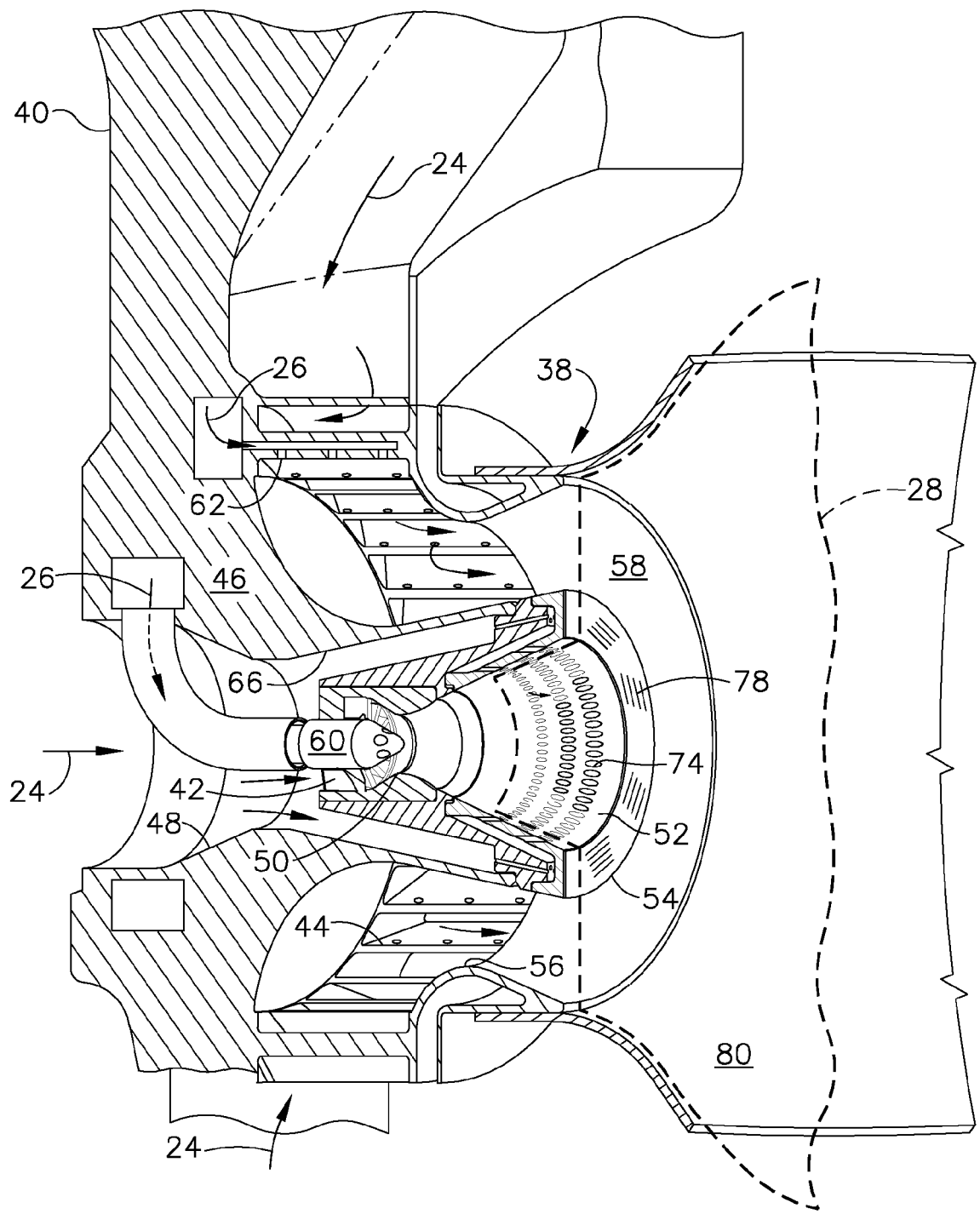
FIG. 3 is an enlarged isometric view of an exemplary swirl cup from FIG. 2 and taken along line 3-3.

The exemplary outer swirl cup 38 is illustrated in more detail in FIG. 3. And, the inner swirl cup 36 is identical in configuration.

Each swirl cup 36,38 includes an annular inner swirler 42 in the form of an inner row of pilot swirl vanes, and an annular outer swirler 44 in the form of an outer row of main swirl vanes.

The inner and outer swirlers 42,44 are coaxial or concentric, and separated radially by a tubular centerbody 46. The centerbody 46 is illustrated in more detail in FIG. 4.

The centerbody 46 includes a converging inlet channel 48 at its forward end for receiving the pressurized compressor discharge air 24. In the aft portion of the centerbody, an inner or pilot venturi 50 defines a local throat of minimum flow area from which the centerbody diverges in increasing diameter axially along a perforate inner or pilot outlet nozzle 52. The conical pilot nozzle 52 terminates aft at the aft end of the centerbody in a flat annular flameholder 54.

The outer swirler 44 illustrated in FIG. 3 channels the compressor discharge air 24 through a radially outer or main venturi 56, and terminates in an annular shroud 58 defining a conically diverging outer or main outlet nozzle. The main nozzle 58 surrounds the aft end of the centerbody 46 and the flameholder 54, which in turn surrounds the pilot nozzle 52 in concentric rings.

The pilot vanes 42 surround a pilot fuel injector 60 extending axially along the centerline axis of the swirl cup 38. Air from the vanes 42 is mixed with fuel from the pilot injector 60 for collectively discharging a pilot fuel and air mixture through the pilot nozzle 52 for combustion during operation.

A plurality of main fuel injectors 62 are integrated into the main swirl vanes 44 for discharging fuel into the main swirl air for collectively discharging a main fuel and air mixture through the main nozzle 58 for combustion during operation.

Fuel is suitably staged or metered through the pilot and main fuel injectors 60,62 for operating the combustor in a dry low emissions (DLE) mode of operation. In particular, the fuel from the main injectors 62 is mixed with the main swirl air for generating a lean fuel and air mixture.

As indicated above in the Background section, combustion instability is a major problem in DLE combustors in which the fuel is burned in a lean premixed flame.

However, this instability problem is eliminated or substantially reduced by preferentially cooling the flameholder 54 as described in more detail hereinbelow.

Figure 4:
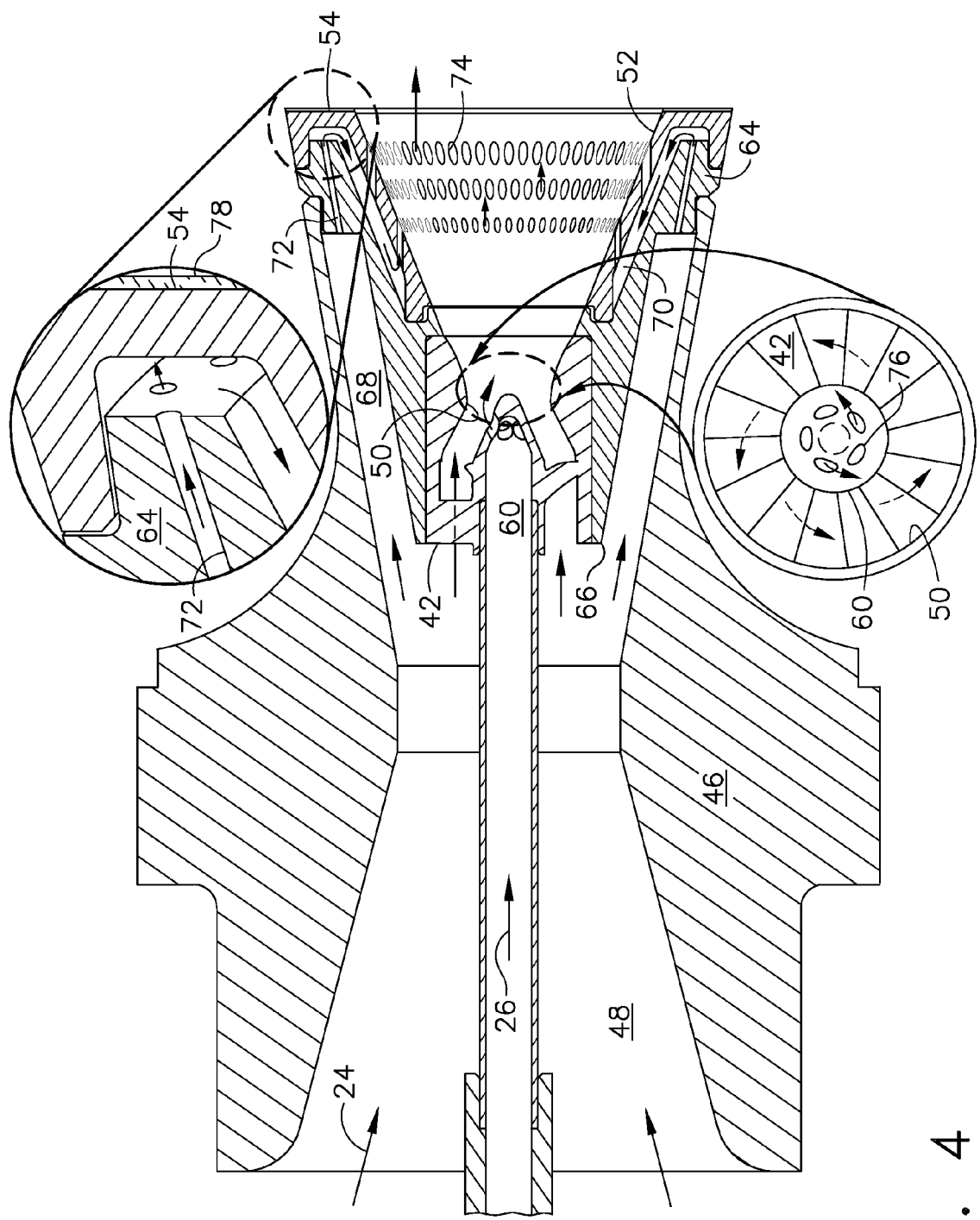
FIG. 4 is an enlarged axial sectional view of the swirl cup illustrated in FIG. 3.

More specifically, the centerbody 46 illustrated in FIG. 4 is hollow and includes an internal impingement ring 64 spaced axially forward from the inside back surface of the flameholder 54. The centerbody also includes an annular air bypass inlet 66 surrounding the inner swirler 42 for bypassing a portion of the pressurized air therefrom. The impingement ring 64 is spaced radially around the pilot nozzle 52 for discharging spent cooling air therethrough.

In the aft end of the centerbody 46, an annular outer manifold 68 extends axially between the bypass inlet 66 and the impingement ring 64. An annular inner plenum 70 is disposed coaxially inside the outer manifold 68 and surrounds the pilot nozzle 52 and terminates at its aft end axially between the impingement ring 64 and the flameholder 54.

The impingement ring 64 includes a row of impingement holes 72 extending axially therethrough. The pilot nozzle 52 includes one or more rows of outlet holes 74 extending therethrough and spaced forwardly from the flameholder 54.

The pilot nozzle 52 diverges aft in an increasing diameter cone to terminate at the flameholder 54. The outlet holes 74 extend axially through the diverging wall of the pilot nozzle 52 in flow communication with the inner plenum 70 for discharging spent cooling air therefrom.

Accordingly, a portion of the pilot air that enters the centerbody inlet 48 bypasses the pilot vanes 42 through the bypass inlet 66 and flows axially aft through the outer manifold 68 for flow through the impingement holes 72 in high speed impingement jets against the back side of the flameholder 54. The spent impingement air reverses direction and is then channeled axially forward through the inner plenum 70 for discharge through the row of outlet holes 74, after again reversing direction.

The centerbody 46 itself is effectively internally cooled by the bypass cooling air channeled through the outer manifold 68 and inner plenum 70. Particularly important is the impingement cooling of the flameholder 54 itself. And additionally important, is the discharge of the spent impingement air inside the pilot nozzle 52 well upstream of the flameholder 54.

In this way, the performance of the main swirler 44, main injectors 62, and main nozzle 58, and the lean premixed combustion process thereof is unaffected by the internal cooling of the flameholder 54. And, the flameholder 54 anchors well the combustion flame (as shown in dashed line in FIG. 3) for enhancing combustion stability, with the flameholder 54 itself being well cooled internally.

Since the spent impingement air twice reverses direction behind the flameholder before discharge from the outlet holes 74, substantial pressure losses are generated therein and the velocity of the spent air is substantially reduced as it is further discharged through the one or more rows of outlet holes 74.

The discharged cooling air provides effective internal film cooling of the pilot nozzle 52 itself and surrounds the pilot fuel and air mixture as it undergoes combustion inside the pilot nozzle 52 (again shown in dashed line in FIG. 3). The collective combustion flow discharged from the pilot nozzle 52 joins the main flame at the surrounding flameholder 54 without disturbing efficiency or stability of the main fuel and air mixture as discharged from the main nozzle 58.

Since the discharged cooling air has been preheated by its passage through the centerbody, and has lost substantial velocity upon discharge through the outlet holes 74, this spent cooling air improves fuel vaporization and enhances flame stability, and thereby reduces UHC and CO exhaust emissions, particularly for applications with low CDP air temperature.

The pilot swirler 42 and pilot nozzle 52 are sized for channeling substantially less airflow than the main swirler 44 and the main nozzle 58, with an airflow ratio being less than about 5%. Component testing of this design has demonstrated effective suppression of combustor instability by anchoring the lean premixed flame on the flameholder base under DLE operating conditions.

Dynamic pressure in the dominant stability mode dramatically decreases with the cooled flameholder 54, which correspondingly increases combustion stability of the lean combustion process. Furthermore, combustion efficiency is substantially higher with the cooled flameholder 54. This results in improved levels of unburned hydrocarbon UHC, carbon monoxide CO, and nitrogen oxides NOx.

As shown in FIG. 4, the pilot vanes 42 extend axially with axially opposite inlet and outlet ends for discharging the airflow in the axially aft direction. The pilot vanes are angled slightly in the circumferential direction for imparting swirl into the airflow.

The corresponding pilot injector 60 is a narrow conduit or tube extending axially through the middle of the pilot vane row, and includes five aft outlet holes 76 for discharging pilot fuel aft of the pilot vanes 42 during operation.

As shown in FIG. 3, the main vanes 44 extend radially with radially opposite inlet and outlet ends. The main vanes are inclined radially inwardly to introduce swirl in the main airflow channeled therethrough, and discharged around the outer surface of the centerbody 46.

The cooperating main injectors 62 are preferably integrated into the main vanes 44 themselves which are hollow, with three exemplary fuel outlets per vane for discharging the main fuel into the swirling airflow there from. In this way, a lean, premixed main fuel and air mixture may be discharged from the main nozzle 58 to surround the pilot fuel and air mixture being discharged from the pilot nozzle 60, with the centerbody 46 and flameholder 54 separating the two carbureting nozzles.

Each of the inner and outer swirl cups 36, 38 illustrated in FIG. 2 may be similarly configured with a corresponding centerbody 46 and the flat flameholder 54 at the aft end thereof, as illustrated in the exemplary embodiment of FIGS. 3 and 4. The flameholder 54 extends radially in the combustor without axial inclination to provide a bluff body for securely anchoring the combustion flame front in the wake thereof.

The internally cooled flameholder 54 itself may be suitably covered with a ceramic thermal barrier coating (TBC) 78 for additional thermal protection from the heat loads of the flame front. The integrally cooled flameholder has particular advantages in the DLE premixers or swirl cups as described herein.

The inner and outer nozzles 52,58 preferably terminate in a common axial plane with the flat flameholder 54 for concentrically discharging the main and pilot fuel/air mixtures. Preferably, the aft end of the main shroud 58 is substantially coplanar with the TBC 78, and terminates slightly proud or aft thereof by about twenty mils (0.5 mm) to protect the fragile TBC from damage during installation of the premixers through the corresponding dome holes.

The two rows of the inner and outer swirl cups 36, 38 are suitably mounted in the annular combustor dome, and suitable heat shields 80 are mounted to the dome to provide thermal insulation in the intervening radial and circumferential spaces between the full complement of swirl cups 36,38.

The flat flameholders 54 cooperate with the generally flat heat shields 80 and securely anchor the combustion gases along the flame front at the dome end of the combustor.

The specifically configured centerbody 46 described above enjoys substantial advantages in performance and efficiency in the combustor, and contributes to the reduction of exhaust emissions during operation.

The centerbody may be incorporated in various forms of swirl cups having inner and outer swirlers in a single annular combustor (SAC), or in dual annular combustor is (DAC), or in any form of combustor with multiple swirl cups there in.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A swirl cup comprising:
an annular inner swirler having a row of pilot swirl vanes and cooperating pilot fuel injector;
an annular outer swirler having a row of main swirl vanes and a cooperating main fuel injector;
a tubular centerbody disposed radially between said inner and outer swirlers, and coaxial therewith;
said centerbody including an annular bypass inlet surrounding said inner swirler and diverging aft along a perforate pilot nozzle to terminate at an annular flameholder; and
said centerbody further including an impingement ring spaced forwardly from said flameholder in flow communication with said bypass inlet for receiving cooling air therefrom, said impingement ring including a plurality of impingement holes configured to direct cooling air at said flameholder and being spaced radially around said pilot nozzle; and an annular outer manifold extending in fluid communication between said bypass inlet and said impingement ring, and an annular inner plenum disposed coaxially inside said outer manifold and around said pilot nozzle, and terminating axially between said impingement ring and said flameholder.

2. A swirl cup according to claim 1 wherein said outer swirler terminates in an annular shroud defining a main nozzle surrounding said pilot nozzle and flameholder.

3. A swirl cup according to claim 2 wherein:
said impingement ring includes a row of impingement holes extends axially therethrough; and
said pilot nozzle includes a row of outlet holes spaced forwardly from said flameholder.

4. A swirl cup according to claim 3 wherein said pilot nozzle diverges aft to said flameholder, and said outlet holes extend axially therethrough in flow communication with said inner plenum for discharging said spent cooling air therefrom.

5. A swirl cup according to claim 4 wherein:
said pilot vanes are disposed radially inwardly of said bypass inlet and forward of said pilot nozzle, and surround said pilot injector for collectively discharging a pilot fuel and air mixture through said pilot nozzle; and
said main vanes include a row of said main injectors for collectively discharging a main fuel and air mixture through said main nozzle.

6. A swirl cup according to claim 5 wherein:
said pilot vanes extend axially for swirling airflow aft, and said pilot injector includes aft outlets for discharging pilot fuel aft of said pilot vanes; and
said main vanes extend radially for swirling airflow radially inwardly around said centerbody, and said main injectors are integrated in said main vanes for discharging main fuel into said swirling airflow therefrom.

7. A swirl cup according to claim 5 arranged in a row thereof in an annular dome of a combustor having radially inner and outer combustion liners extending aft therefrom.

8. A combustor according to claim 7 further comprising radially inner and outer rows of said swirl cups mounted in said dome.

9. A combustor according to claim 8 wherein:
each of said pilot nozzles comprises three rows of said outlet holes spaced axially in turn forward of said flameholders; and
said flameholders between said inner and outer swirlers extend radially without axial inclination, and are covered by a thermal barrier coating.

10. A combustor swirl cup comprising:
coaxial inner and outer swirlers separated by a tubular centerbody radially therebetween;
said centerbody including an annular bypass inlet surrounding said inner swirler and diverging aft along a perforate inner nozzle to terminate at an annular flameholder; and
said centerbody further including an impingement ring spaced forwardly from said flameholder in flow communication with said bypass inlet for receiving cooling air therefrom, said impingement ring including a plurality of impingement holes configured to direct the cooling air at said flameholder and being spaced radially around said inner nozzle; and an annular outer manifold extending in fluid communication between said bypass inlet and said impingement ring, and an annular inner plenum disposed coaxially inside said outer manifold and around said inner nozzle, and terminating axially between said impingement ring and said flameholder.

11. A swirl cup according to claim 10 wherein:
said impingement ring includes a row of impingement holes extending axially therethrough; and
said inner nozzle includes a row of outlet holes spaced forwardly from said flameholder.

12. A swirl cup according to claim 11 wherein said inner nozzle diverges aft to said flameholder, and said outlet holes extend axially therethrough in flow communication with said inner plenum for discharging said spent cooling air therefrom.

13. A swirl cup according to claim 12 wherein:
said inner swirler comprises a row of pilot swirl vanes disposed radially inwardly of said bypass inlet and forward of said inner nozzle, and surrounding a pilot fuel injector for collectively discharging a pilot fuel and air mixture through said inner nozzle; and
said outer swirler comprises a row of main swirl vanes terminating in an annular shroud defining an outer nozzle surrounding said flameholder, and having a row of main fuel injectors for collectively discharging a main fuel and air mixture through said outer nozzle.

14. A swirl cup according to claim 13 wherein:
said pilot vanes extend axially for swirling airflow aft, and said pilot injector includes aft outlets for discharging pilot fuel aft of said pilot vanes; and said main vanes extend radially for swirling airflow radially inwardly around said centerbody, and
said main injectors are integrated in said main vanes for discharging main fuel into said swirling airflow therefrom.

15. A combustor including an annular dome having radially inner and outer combustion liners extending aft therefrom and including a plurality of swirl cups according to claim 13 arranged in a row in the annular dome.

16. A combustor according to claim 15 further comprising radially inner and outer rows of said swirl cups mounted in said dome.

17. A combustor according to claim 16 wherein the inner nozzle of each swirl cup comprises three rows of said outlet holes spaced axially in turn forward the corresponding flameholder of each swirl cup.

18. A combustor according to claim 17 wherein said flameholders between said inner and outer swirlers extend radially without axial inclination, and are covered by a thermal barrier coating.

* * * * *